United States Patent
Sugahara et al.

(10) Patent No.: US 8,375,169 B2
(45) Date of Patent: Feb. 12, 2013

(54) MEMORY CONTROLLER

(75) Inventors: Takahiko Sugahara, Osaka (JP); Tetsuo Furuichi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 859 days.

(21) Appl. No.: 11/968,427

(22) Filed: Jan. 2, 2008

(65) Prior Publication Data

US 2008/0183982 A1 Jul. 31, 2008

(30) Foreign Application Priority Data

Jan. 25, 2007 (JP) ................................. 2007-015096

(51) Int. Cl.
*G06F 13/00* (2006.01)

(52) U.S. Cl. .................................... 711/119; 711/103

(58) Field of Classification Search .................. 711/117, 711/161
See application file for complete search history.

(56) References Cited

U.S. PATENT DOCUMENTS

| | | | |
|---|---|---|---|
| 6,715,039 B1 * | 3/2004 | Michael et al. | 711/133 |
| 7,028,156 B1 * | 4/2006 | Kiselev et al. | 711/162 |
| 7,117,306 B2 * | 10/2006 | Rudelic | 711/118 |
| 7,337,277 B2 * | 2/2008 | Benhase et al. | 711/135 |
| 2003/0206442 A1 * | 11/2003 | Tang et al. | 365/185.17 |
| 2005/0080986 A1 * | 4/2005 | Park | 711/103 |
| 2005/0210184 A1 | 9/2005 | Chen et al. | |
| 2006/0271755 A1 * | 11/2006 | Miura | 711/165 |
| 2007/0239938 A1 * | 10/2007 | Pong | 711/122 |

FOREIGN PATENT DOCUMENTS

| | | |
|---|---|---|
| JP | 61-253564 | 11/1986 |
| JP | 62-130443 | 6/1987 |
| JP | 63-276648 A | 11/1988 |
| JP | 1-100799 | 4/1989 |
| JP | 1-134798 | 5/1989 |
| JP | 3-59741 | 3/1991 |
| JP | 5-94367 A | 4/1993 |
| JP | 6-290109 A | 10/1994 |
| JP | 7-95307 | 10/1995 |
| JP | 10-11284 A | 1/1998 |
| JP | 10-161939 A | 6/1998 |
| JP | 3474474 | 9/2003 |
| JP | 2004-164606 | 6/2004 |
| JP | 2004-272870 | 9/2004 |
| JP | 2005-235182 | 9/2005 |
| JP | 2006-209415 | 8/2006 |
| JP | 2006-323739 | 11/2006 |

OTHER PUBLICATIONS

Handy, Jim, The Cache Memory Book, 1998, Academic Press, Inc., second edition, pp. 13-15.*
U.S. Appl. No. 13/257,644, filed Sep. 20, 2011, Sugahara et al.
U.S. Appl. No. 13/257,680, filed Sep. 20, 2011, Sugahara et al.
U.S. Appl. No. 13/423,566, filed Mar. 19, 2012, Sugahara et al.

* cited by examiner

*Primary Examiner* — Jared Rutz

(74) *Attorney, Agent, or Firm* — Oblon, Spivak, McClelland, Maier & Neustadt, L.L.P.

(57) ABSTRACT

An address comparator stores an address of data read out by a host system. Also, a buffer reads out the data from a memory and stores the data. If an address of data which is expected to be newly read out by the host system is included in addresses which have already been stored in the address comparator, the host system 1 newly reads out the data from the buffer, not from the memory. As a result, it is possible to eliminate or lessen the possibility of unintentional rewriting of data which is likely to be caused due to repeated readout of data.

14 Claims, 7 Drawing Sheets

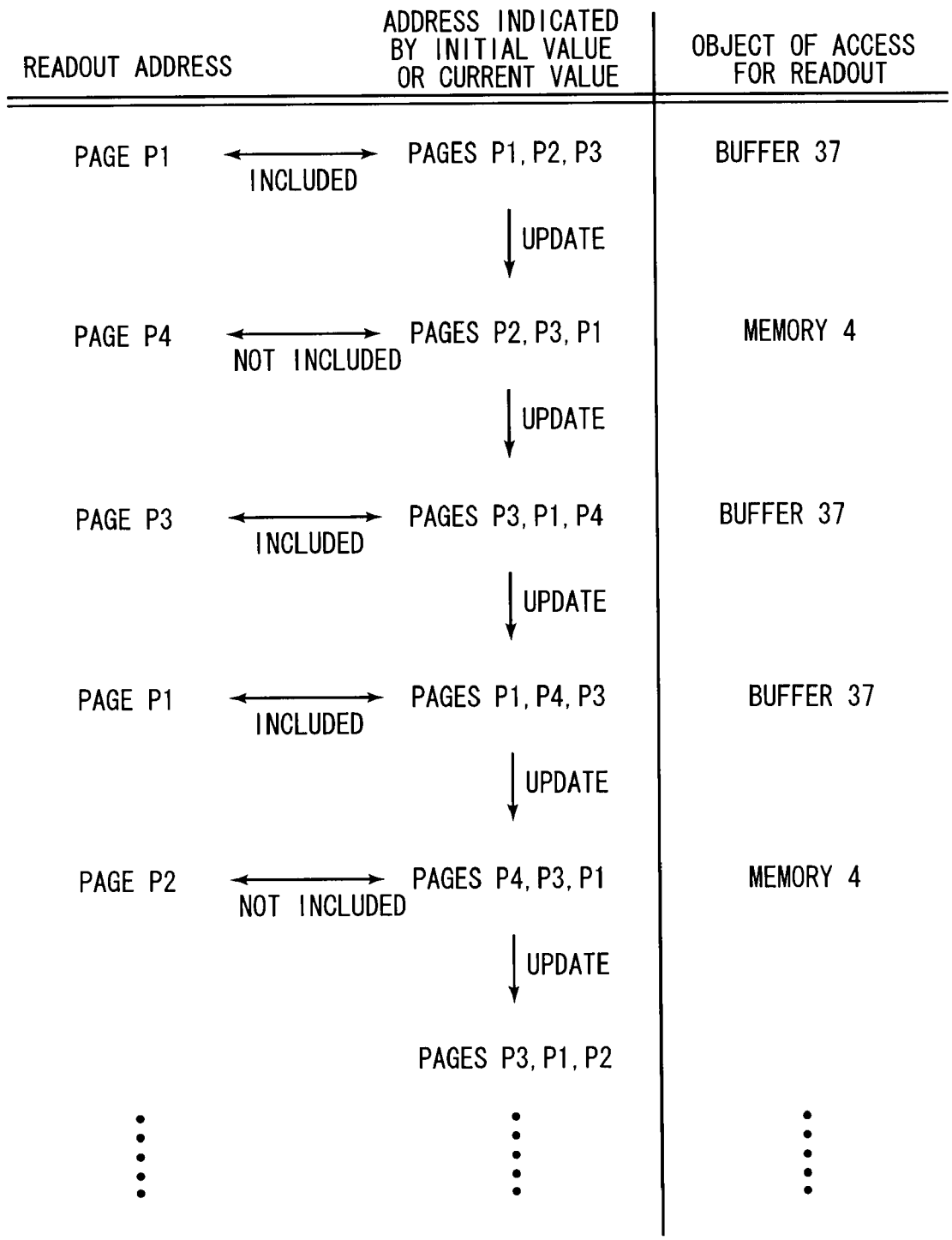

FIG 5

| READOUT ADDRESS | ADDRESS INDICATED BY INITIAL VALUE OR CURRENT VALUE | TOP TWO ADDRESSES REGARDING THE NUMBER OF TIMES OF OUTPUT | MOST RECENT FIVE ADDRESSES IMMEDIATELY BEFORE INPUT OF READOUT COMMAND | OBJECT OF ACCESS FOR READOUT |
|---|---|---|---|---|
| PAGE P1 | →PAGES P1, P2 INCLUDED | | PAGES P1, P1, P2, P2, P3 | BUFFER 37 |
| | ↓UPDATE | | ↓UPDATE | |
| PAGE P3 | →PAGES P1, P2 NOT INCLUDED | | PAGES P1, P2, P2, P3, P1 | MEMORY 4 |
| | ↓UPDATE | | ↓UPDATE | |
| PAGE P2 | →PAGES P2, P3 INCLUDED | | PAGES P2, P2, P3, P1, P3 | BUFFER 37 |
| | ↓UPDATE | | ↓UPDATE | |
| PAGE P2 | →PAGES P2, P3 INCLUDED | | PAGES P2, P3, P1, P3, P2 | BUFFER 37 |
| | ↓UPDATE | | ↓UPDATE | |
| ..... | PAGES P2, P3 | | PAGES P3, P1, P3, P2, P2 | ..... |

FIG 6

| READOUT ADDRESS | ADDRESS INDICATED BY INITIAL VALUE OR CURRENT VALUE | OBJECT OF ACCESS FOR READOUT |
|---|---|---|
| PAGE P1 ←INCLUDED→ | PAGES P1, P2, P3 | BUFFER 37 |
| | ↓ NOT UPDATE | |
| PAGE P4 ←NOT INCLUDED→ | PAGES P1, P2, P3 | MEMORY 4 |
| | ↓ NOT UPDATE | |
| PAGE P2 ←INCLUDED→ | PAGES P1, P2, P3 | BUFFER 37 |
| | ↓ NOT UPDATE | |
| | PAGES P1, P2, P3 | |
| ⋮ | ⋮ | ⋮ |

US 8,375,169 B2

MEMORY CONTROLLER

BACKGROUND OF THE INVENTION

1. Field of the Invention

The present invention relates to a technique to avoid unintended rewriting of data or reduce the possibility thereof, due to repeated readouts of data from a nonvolatile memory.

2. Description of the Background Art

NAND flash memories, among nonvolatile memories, are heavily used for SD memory cards or the like for the purpose of achieving high integration, reduction in manufacturing cost and easy writing for users by simplifying circuit configurations.

In recent, NAND flash memories are adopted for game machines or the like. When the NAND flash memories are used for game machines, there occurs no write operation but only consecutive read operations. In other words, NAND flash memories have been increasingly adopted as ROMs.

Since specific programs are repeatedly read out in the game machines or the like in most cases, however, it begins to be noticed that the programs could be unintendedly rewritten. Such a phenomenon is termed "read disturb phenomenon", and the mechanism of this phenomenon will be briefly discussed below.

FIG. 7 is a schematic diagram showing an NAND flash memory. The NAND flash memory is constituted of a bit line 41 and word lines 42, 43 and 44 which are arranged in a lattice manner, memory cells 52 and 53, a selection transistor 54 and the like.

In a case where binary data ("0" or "1") stored in the memory cell 52 is read out, the memory cell 52 is a selected cell and the memory cell 53 is an unselected cell. First, the selection transistor 54 specifies the bit line 41 to which the selected cell 52 belongs. Next, a low gate voltage (V(Low)=0V) is applied to the word line 42 to which the selected cell 52 belongs. Then, a high gate voltage (V(High)) of approximately 5V) is applied to the word line 43 to which the unselected cell 53 belongs. At that time, since the unselected cell 53 is in a very weak writing condition, electrons are trapped in a floating gate of the unselected cell 53 and accumulated therein. In other words, when binary data stored in the selected cell 52 is repeatedly read out, there is a possibility that a threshold voltage of the unselected cell 53 might be shifted and binary data stored in the unselected cell 53 might be unintendedly rewritten, being changed from "1" to "0".

Even if the binary data stored in the unselected cell 53 is unintendedly rewritten, however, when data are collectively erased before new data are written, it is possible to recover the function of the unselected cell 53. But, if there occurs no write operation and only consecutive read operations, it is impossible to recover the function of the unselected cell 53.

US Patent Application Publication No. 2005/0210184 discloses means for avoiding the above-discussed read disturb phenomenon by controlling the inside of a memory cell. This disclosed method, however, can be applied to a memory having a specific cell configuration but can not be applied to any other cell configuration. In other words, by this method, it is impossible to avoid the read disturb phenomenon without depending on cell configurations of memories.

SUMMARY OF THE INVENTION

The present invention is intended to a memory controller for controlling access to a storage device.

A memory controller according to the present invention comprises: an address comparator for comparing a first address used for readout which is output from a host system which processes data stored in the storage device, with a second address used for readout which is output from the host system previous to the first address; a buffer for storing data at the second address; and a part for outputting data at the first address which is read out from the buffer to the host system if the first address is included in the second address, and outputting data at the first address which is read out from the storage device to the host system if the first address is not included in the second address.

According to the present invention, in order to read out again the same data that has been read out before, the host system reads out the data from the buffer included in the memory controller, not from a memory. As a result, a "read disturb" phenomenon can be avoided or suppressed.

A memory controller according to the present invention comprises: an address comparator for comparing a readout address which is output from a host system which processes data stored in the storage device, with a predetermined address which is previously set; a buffer for storing data at the predetermined address; and a part for outputting data at the readout address which is read out from the buffer to the host system if the readout address is included in the predetermined address, and outputting data at the readout address which is read out from the storage device to the host system if the readout address is not included in the predetermined address.

According to the present invention, in order to read out again predetermined data, the host system reads out the predetermined data from the buffer included in the memory controller, not from a memory. As a result, a "read disturb" phenomenon can be avoided or suppressed.

Therefore, it is an object of the present invention to provide a technique for avoiding or suppressing a "read disturb" phenomenon in various types of non-volatile memories without constraints imposed by a cell structure of a memory.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing time series of variations of an address indicated by an initial value or a current value and an object of access for readout according to the second preferred embodiment;

FIG. 5 is a view showing time series of variations of an address indicated by an initial value or a current value and an object of access for readout according to the third preferred embodiment;

FIG. 6 is a view showing time series of variations of an address indicated by an initial value or a current value and an object of access for readout according to the fourth preferred embodiment.

DESCRIPTION OF THE PREFERRED EMBODIMENTS

<First Preferred Embodiment>

Figure 1:
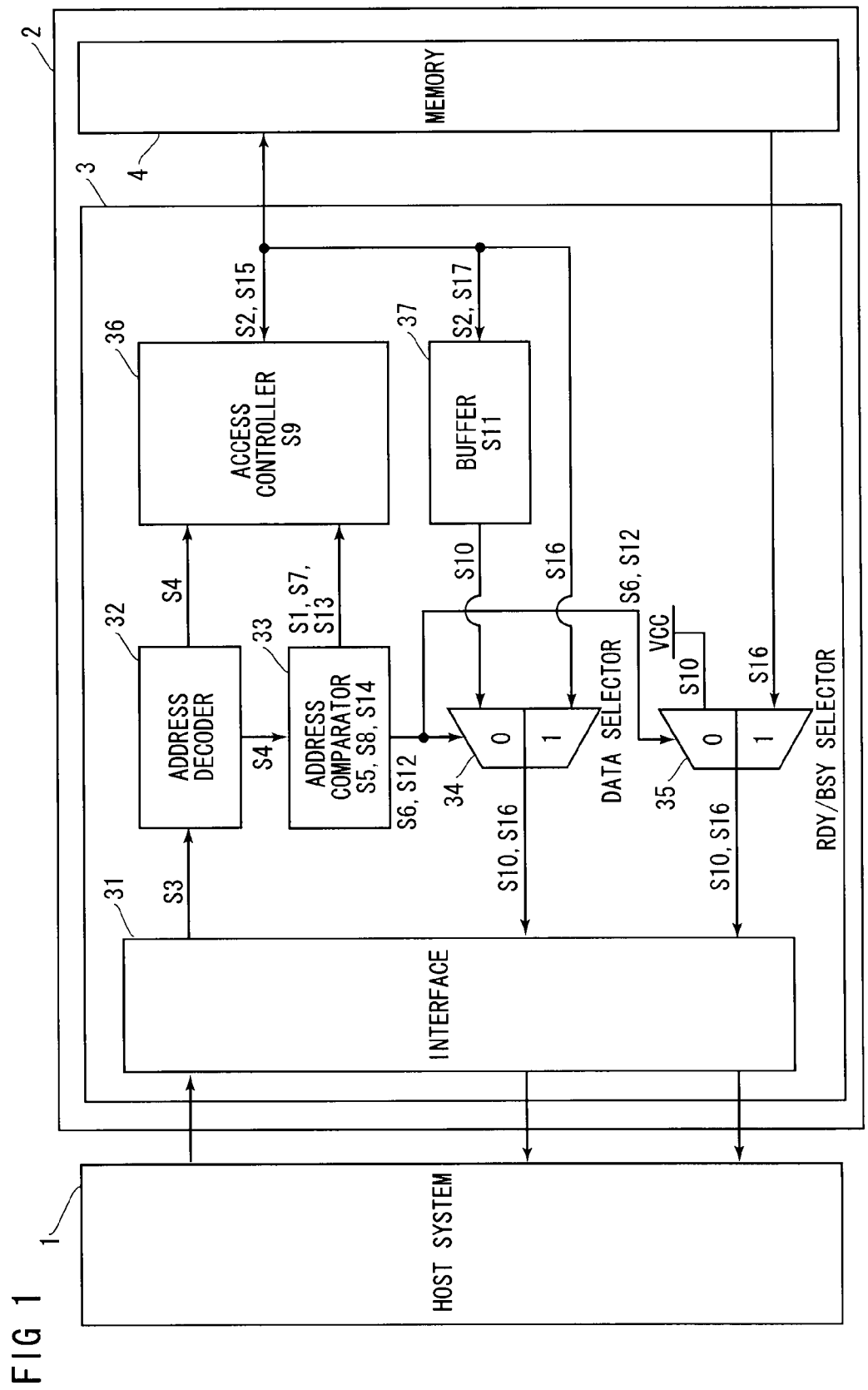
FIG. 1 is a block diagram of a memory module according to first, second, third, and fourth preferred embodiments.

Hereinafter, a first preferred embodiment of the present invention will be discussed with reference to accompanying drawings. FIG. 1 is a block diagram of a memory module according to the first preferred embodiment. A host system 1 and a memory module 2 are connected with each other via an interface 31 provided in the memory module 2. The host system 1 outputs a command which designates an address of data which is expected to be read out ("readout command") to the memory module 2. Also, the host system 1 processes data such as a program which is read out from a memory 4 provided in the memory module 2. A body of a game machine is cited as an example of the host system 1, and a game cartridge is cited as an example of the memory module 2.

The memory module 2 includes a memory controller 3 and the memory 4. The memory controller 3 is able to control access to the memory 4 when the host system 1 reads out data from the memory 4. Also, the memory controller 3 is able to prevent the host system 1 from gaining direct access to the memory 4 when the host system 1 repeatedly reads out data from the memory 4. Because of the inclusion of the memory controller 3, it is possible to avoid or suppress a "read disturb" phenomenon. A concrete method of avoiding or suppressing a "read disturb" phenomenon will be later described in detail.

The memory 4 is a storage device for storing data which is read out by the host system 1. In a case where the host system 1 is a body of a game machine, data stored in the memory 4 is a game program processed by the host system 1. The memory 4 is a non-volatile memory, and further, in the first preferred embodiment, the memory 4 is a NAND flash memory of a single-level cell (SLC) type (SLC NAND flash memory). However, the present invention can be applied to the other types of non-volatile memories such as a NAND flash memory of a multi-level cell (MLC) type (MLC NAND flash memory) and a NOR flash memory.

The memory controller 3 includes the interface 31, an address decoder 32, an address comparator 33, a data selector 34, a RDY/BSY selector 35, an access controller 36, a buffer 37, and the like.

The interface 31 allows the host system 1 and the memory module 2 to exchange a readout command and read data therebetween.

The address decoder 32 extracts an address at which data which is expected to be read out is stored ("readout address") from a readout command which is received from the host system 1. Also, the address decoder 32 outputs the thus extracted readout address to the address comparator 33 and the access controller 36.

The address comparator 33 stores a readout address which is received from the address decoder 32. Then, the address comparator 33 compares a current readout address which has most recently been received, with a previous readout address which was received immediately before the current readout address.

In a case where a current readout address and a previous readout address match each other, the address comparator 33 outputs a switching signal for switching to a buffer access path, to the data selector 34 and the RDY/BSY selector 35. Also, the address comparator 33 outputs a memory access denial signal to the access controller 36. As a result, in reading out the same data that was previously read out by the host system 1, it is impossible to gain access to the memory 4 and access to the buffer 37 is permitted.

In a case where a current readout address and a previous readout address do not match each other, the address comparator 33 outputs a switching signal for switching to a memory access path, to the data selector 34 and the RDY/BSY selector 35. Also, the address comparator 33 outputs a memory access request signal to the access controller 36.

As a result of comparison between a current readout address and a previous readout address in the address comparator 33, the task of reading out the same data that was previously read out by the host system 1 can be achieved by gaining access to the buffer 37 without a need for access to the memory 4. Accordingly, it is possible to avoid or suppress a "read disturb" phenomenon.

The data selector 34, in response to a switching signal for switching to a buffer access path which is received from the address comparator 33, establishes access between the buffer 37 and the host system 1. Also, the data selector 34, in response to a switching signal for switching to a memory access path which is received from the address comparator 33, establishes access between the memory 4 and the host system 1.

The RDY/BSY selector 35, in response to a switching signal for switching to a buffer access path which is received from the address comparator 33, outputs an always RDY signal which indicates that the buffer 37 is always in a ready mode, to the host system 1. Also, the RDY/BSY selector 35, in response to a switching signal for switching to a memory access path which is received from the address comparator 33, outputs a RDY signal which indicates that the memory 4 is in a ready mode and a BSY signal which indicates that the memory 4 is in a busy mode, to the host system 1.

In a case where the host system 1 reads out data from the buffer 37, by fixing a signal which indicates an operation mode of the buffer 37 to a RDY signal, it is possible to read out data from the buffer 37 at a high speed.

The access controller 36 is able to control direct access to the memory 4. More specifically, the access controller 36, in response to a memory access denial signal received from the address comparator 33, does not gain access to a readout address which is provided to the address comparator 33 from the address decoder 32. Also, the access controller 36, in response to a memory access request signal received from the address comparator 33, gains access to a readout address which is provided to the address comparator 33 from the address decoder 32.

The buffer 37 stores data which is read out by the host system 1. When the host system 1 reads out data from the memory 4, the buffer 37 newly reads out from the memory 4 and stores the same data as is read out by the host system 1. On the other hand, when the host system 1 reads out data from the buffer 37, the buffer 37 holds the read data which has already been stored therein without newly reading out from the memory 4 and storing the same data as is read out by the host system 1.

The buffer 37 must be a rewritable memory because the buffer 37 newly stores read data in some cases. In the first preferred embodiment, an SRAM is employed as the buffer 37 in order to increase a speed of access between the host system 1 and the buffer 37. However, the present invention can be applied to a case where the buffer 37 is any other type of rewritable memory.

Figure 2:
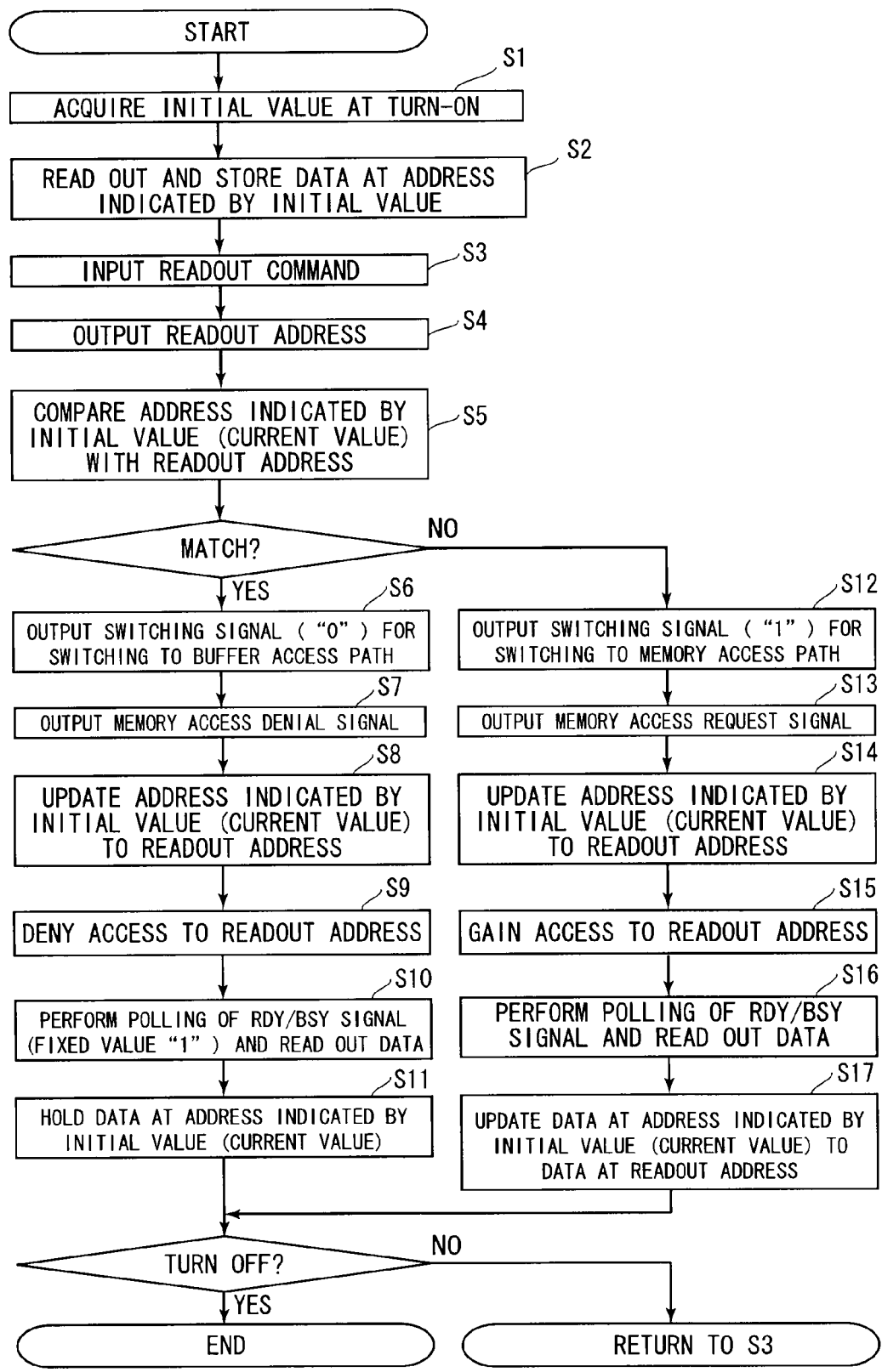
FIG. 2 is a flow chart showing processes for reading out data by a host system according to the first preferred embodiment.

Below, a flow of processes for avoiding or suppressing a "read disturb" phenomenon in an information processor formed of the host system 1 and the memory module 2 as discussed above will be discussed. FIG. 2 is a flow chart showing processes for reading out data by the host system 1 according to the first preferred embodiment. Respective reference numerals beginning with "S" which indicate respective steps in FIG. 2 correspond to the respective reference numerals beginning with "S" in FIG. 1. In the first preferred embodiment, the host system 1 reads out data on a page-by-page basis, and also, the buffer 37 is able to store a page of data.

First, the memory module 2 is mounted onto the host system 1. In a case where the host system 1 is a body of a game machine and the memory module 2 is a game cartridge, the memory module 2 is inserted into the host system 1. Then, the host system 1 is turned on.

The access controller 36 acquires an initial value which is set by the address comparator 33 (step S1). Note that each of an initial value and a current value which will be later described in detail corresponds to a top portion or the like of a page or a block. Since the host system 1 reads out data on a page-by-page basis in the first preferred embodiment, each of an initial value and a current value corresponds to a top portion of a page.

Now, we will describe methods for setting an initial value in the address comparator 33, giving specific examples. In a first method, a current value which was set by the address comparator 33 when the host system 1 was turned off before is employed as an initial value when the host system 1 is again turned on. In a second method, a specific initial value is set each time the host system 1 is turned on.

In setting an initial value in the address comparator 33, it is desirable that the memory module 2 includes a non-volatile memory which keeps storing an initial value even while the host system 1 is turned off. As a non-volatile memory which stores an initial value, a non-volatile memory provided within the address comparator 33, a portion of the memory 4 which is a non-volatile memory, a distinct non-volatile memory which is additionally provided, and the like can be cited. Alternatively, in the method in which a specific initial value is set each time the host system 1 is turned on, the memory 4 may be configured to store the specific initial value.

After the access controller 36 acquires the initial value which is set by the address comparator 33, the access controller 36 gains access to the memory 4, to read out data at an address indicated by the initial value. Then, the data read out by the access controller 36 is stored in the buffer 37 (step S2). By performing the above-discussed processes, an initial stage is completed.

Next, a readout command which is output from the host system 1 is input to the address decoder 32 via the interface 31 (step S3). The address decoder 32 extracts a readout address from the input readout command, and outputs the extracted readout address to the address comparator 33 and the access controller 36 (step S4).

The address comparator 33 compares the address indicated by the initial value which is set in the step S1 with the readout address which is received from the address decoder 32 (step S5). If the address indicated by the initial value and the readout address match each other, it means that data which is expected to be read out by the host system 1 and data which is stored in the buffer 37 in the step S2 match each other. On the other hand, if the address indicated by the initial value and the readout address do not match each other, it means that data which is expected to be read out by the host system 1 and data which is stored in the buffer 37 in the step S2 do not match each other. Below, respective process flows in cases where the address indicated by the initial value and the readout address match, and do not match, each other will be discussed.

First, consider a case where the address indicated by the initial value which is set in the step S1 and the readout address which is received from the address decoder 32 match each other. In this case, the address comparator 33 outputs a switching signal "0" for switching to a buffer access path to the data selector 34 and the RDY/BSY selector 35 (step S6). Also, the address comparator 33 outputs a memory access denial signal to the access controller 36 (step S7).

The address comparator 33 updates the address indicated by the initial value which is set in the step S1 to the readout address which is received from the address decoder 32 (step S8). A current value which has been described above with respect to the step S1 represents the latter address. Alternatively, since it is assumed that the two addresses match each other in the present case, the address comparator 33 may be controlled not to update the address indicated by the initial value which is set in the step S1.

The access controller 36, which receives a memory access denial signal, enters into an inoperative mode (step S9). Also, the RDY/BSY selector 35, which receives the switching signal "0" for switching to a buffer access path, outputs a RDY/BSY signal (having a fixed value, "1") to the host system 1 via the interface 31. The RDY/BSY signal (having a fixed value, "1") is an always RDY signal regardless of an operation mode of the buffer 37. The host system 1 performs polling of the RDY/BSY signal (having a fixed value, "1"), to thereby read out the data which is stored in the buffer 37 in the step S2 (step S10). In other words, the host system 1 is able to read out data from the buffer 37 at a high speed regardless of an operation mode of the buffer 37. The buffer 37 holds the data which has been stored therein in the step S2 (step S11).

If the host system 1 is not turned off, processes will proceed from the step S3 thereafter. A flow of the processes which will proceed thereafter will be briefly discussed at later paragraphs. If the host system 1 is turned off, no process is performed.

As a result of the above-discussed process flow, in the case where the address indicated by the initial value which is set in the step S1 and the readout address which is received from the address decoder 32 match each other, the host system 1 gains access to the buffer 37 without a need for access to the memory 4, to thereby read out data while avoiding or suppressing a "read disturb" phenomenon.

Next, consider a case where the address indicated by the initial value which is set in the step S1 and the readout address which is received from the address decoder 32 do not match each other. In this case, the address comparator 33 outputs a switching signal "1" for switching to a memory access path to the data selector 34 and the RDY/BSY selector 35 (step S12). Also, the address comparator 33 outputs a memory access request signal to the access controller 36 (step S13).

The address comparator 33 updates the address indicated by the initial value which is set in the step S1 to the readout address which is received from the address decoder 32 (step S14). A current value which has been discussed above with respect to the step S1 represents the latter address.

The access controller 36, which receives a memory access request signal, gains access to the readout address which is provided to the address comparator 33 from the address decoder 32 (step S15). On the other hand, the RDY/BSY selector 35, which receives the switching signal "1" for switching to a memory access path, outputs a RDY/BSY signal to the host system 1 via the interface 31. The host system 1 performs polling of the RDY/BSY signal, to confirm that the memory 4 is in a ready mode, and then, reads out data stored in the memory 4 (step S16). The buffer 37 updates the data which is stored in the step S2 to the data which is read out by the host system 1 (step S17).

If the host system 1 is not turned off, processes will proceed from the step S3 thereafter. More specifically, the address comparator 33 compares a new readout address designated by a new readout command which is output from the host system 1, with the address indicated by the current value (step S5). If the new readout address and the address indicated by the current value match each other, the host system 1 reads out data from the buffer 37 (step S10). On the other hand, if the new readout address and the address indicated by the current value do not match each other, the host system 1 reads out data from the memory 4 (step S16). The same processes will proceed also when the host system 1 outputs a further new readout command. If the host system 1 is turned off, no process is performed.

Below, how an address indicated by an initial value or a current value which is stored in the address comparator 33 and an object of access for readout (an object which is expected to be accessed for reading out some information therefrom) vary while the host system 1 is consecutively outputting readout commands in the above-discussed process flow will be specifically discussed.

Figure 3:
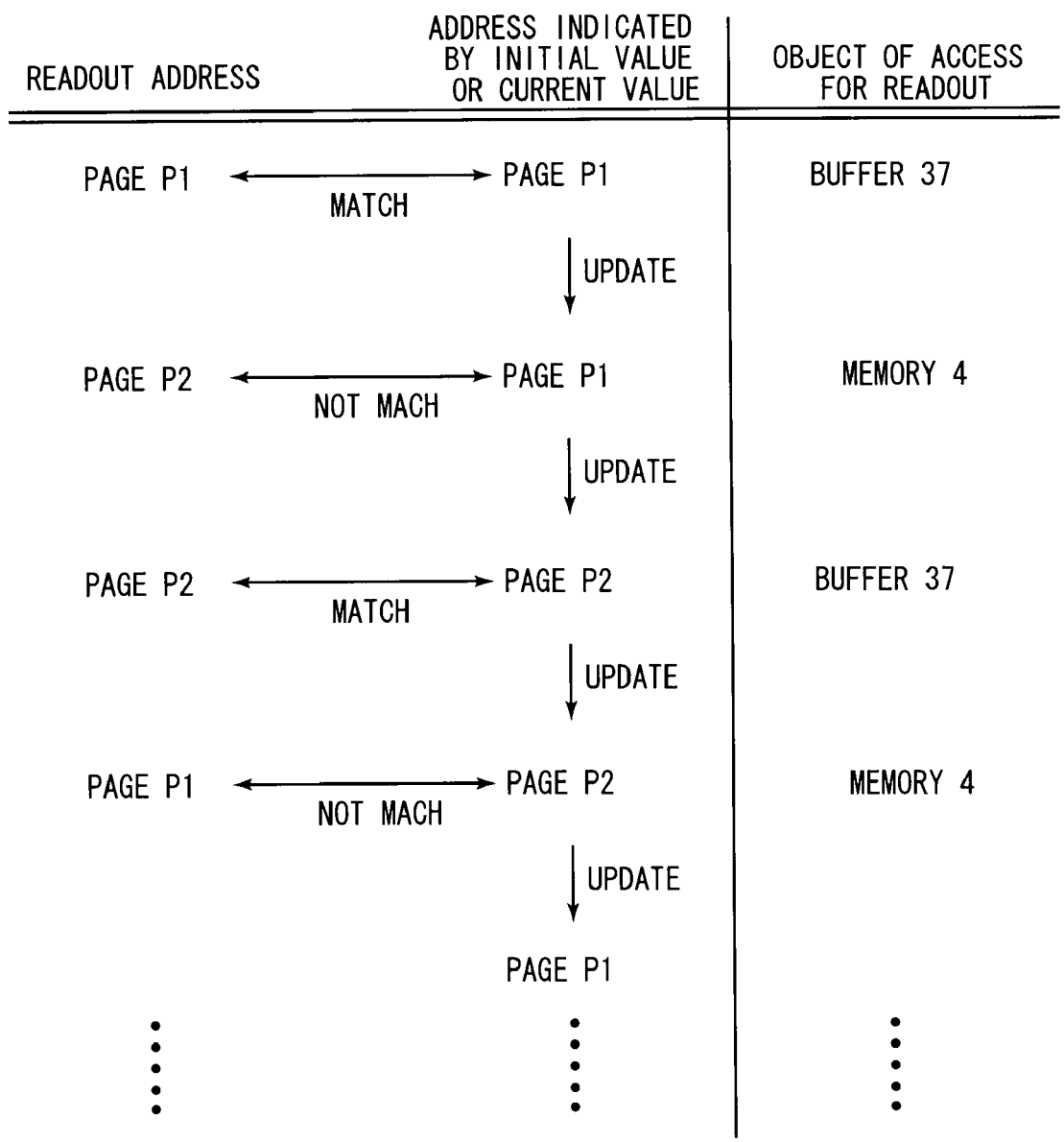
FIG. 3 is a view showing time series of variations of an address indicated by an initial value or a current value and an object of access for readout according to the first preferred embodiment.
Figure 7:
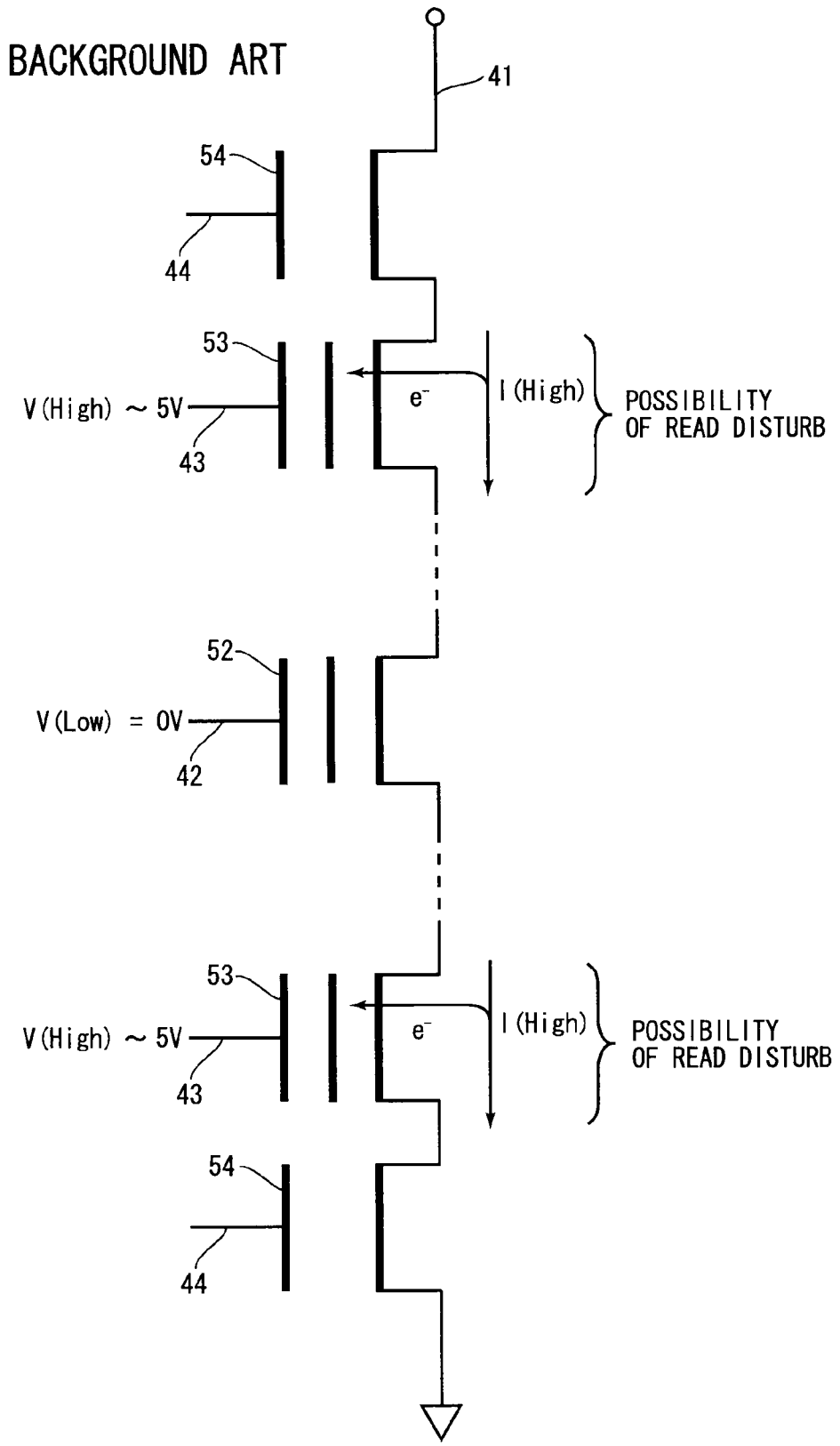
FIG. 7 is a schematic view of a NAND flash memory.

FIG. 3 is a view showing time series of variations of an address indicated by an initial value or a current value and an object of access for readout according to the first preferred embodiment. In FIG. 3, it is assumed that time elapses as a position therein moves from an upper portion to a lower portion. Items on the first line under double lines in FIG. 3 represent that when an address indicated by an initial value or a current value is a page P1, in response to a readout command which tells that the page P1 is a readout address being output from the host system 1 (step S3), the address comparator 33 determines that the two addresses match each other (step S5), so that the buffer 37 becomes an object of access for readout (step S10).

The address comparator 33 updates the address indicated by an initial value or a current value to the readout address (step S8). If the two addresses match each other, the address comparator 33 may alternatively be configured not to update the address indicated by an initial value or a current value. Also, the buffer 37 holds data at the page P1 which has already been stored therein (step S11).

Items on the third line under the double lines in FIG. 3 represent that when an address indicated by a current value is the page P1, in response to a readout command which tells that a page P2 is a readout address being output from the host system 1 (step S3), the address comparator 33 determines that the two addresses do not match each other (step S5), so that the memory 4 becomes an object of access for readout (step S16).

The address comparator 33 updates the address indicated by a current value to the readout address (step S14). Also, the buffer 37 updates the data at the page P1 which has already been stored therein to data at the page P2 (step S17). Items on the fifth and seventh lines under the double lines in FIG. 3 represent that the same processes as described above with respect to the first and third lines under the double lines in FIG. 3 are performed.

<Second Preferred Embodiment>

According to the first preferred embodiment, the host system 1 gains access to the buffer 37 without a need for access to the memory 4 in order to read out again the same data that was read out before, so that a "read disturb" phenomenon can be avoided or suppressed. In this regard, a technique for avoiding or suppressing a "read disturb" phenomenon even in a case where a readout command which tells that the page P1 is a readout address and a readout command which tells that the page P2 is a readout address are alternately output from the host system 1, for example, will be discussed with reference to FIGS. 4, 5, and 6, respectively in second, third, and fourth preferred embodiments, as follows. It is noted that the structure and function of the memory module 2 in the second, third, and fourth preferred embodiments are the same as shown in FIG. 1 in the first preferred embodiment.

FIG. 4 is a view showing time series of variations of an address indicated by an initial value or a current value and an object of access for readout according to the second preferred embodiment. The address indicated by an initial value or a current value includes readout addresses designated by most recent three readout commands which have been output from the host system 1 and is stored in the address comparator 33. In FIG. 4, the readout addresses stored in the address comparator 33 are put from the left side to the right side in an order in which the readout addresses are output from the host system 1. More specifically, an expression "PAGES P1, P2, and P3" represents that the host system 1 outputs the readout addresses in an order "P1, P2, and P3". The host system 1 reads out data on a page-by-page basis. Also, the buffer 37 is able to store three pages of data, to correspond to the address comparator 33 which stores three addresses.

If the address indicated by an initial value or a current value includes a new readout address, the buffer 37 becomes an object of access for readout. The buffer 37 holds data which has already been stored therein.

If the address indicated by an initial value or a current value does not include a new readout address, the memory 4 becomes an object of access for readout. The buffer 37 updates data corresponding to the first readout command out of data corresponding to the above-noted most recent three readout commands, to data corresponding to a new readout command.

The address comparator 33 updates the address indicated by an initial value or a current value regardless of whether or not the address indicated by an initial value or a current value includes a new readout address. More specifically, in this updating in the address comparator 33, the readout address designated by the first readout command out of the readout addresses designated by the above-noted most recent three readout commands is erased, and a readout address designated by the new readout command is added.

<Third Preferred Embodiment>

FIG. 5 is a view showing time series of variations of an address indicated by an initial value or a current value and an object of access for readout according to the third preferred embodiment. The address indicated by an initial value or a current value includes readout addresses designated by two readout commands which have been output from the host system 1 the largest and the second-largest number of times, out of readout addresses designated by most recent five readout commands which have been output from the host system 1 and is stored in the address comparator 33. The host system 1 reads out data on a page-by-page basis. Also, the buffer 37 is able to store two pages of data, to correspond to the address comparator 33 which stores the top two addresses regarding the number of times of output.

In the third preferred embodiment, the address comparator 33 needs to store not only the address indicated by an initial value or a current value, but also the readout addresses designated by the most recent five readout commands which have been output from the host system 1. However, the buffer 37 does not need to store all data corresponding to the most recent five readout commands, and is required only to store date corresponding to the top two readout commands regarding the number of times of output.

In one application of the third preferred embodiment, the address comparator 33 stores a histogram of the number of outputs of readout addresses designated by the readout commands which are output from the host system 1. Then, the address comparator 33 refers to the histogram stored therein, to select a readout address which was output many times and compares the selected readout address with a readout address designated by a readout command which has been most recently output from the host system 1.

An example of a process in which the address comparator 33 stores a histogram of the number of outputs is as follows. First, the address comparator 33 stores a histogram of the number of outputs of readout addresses designated by readout commands which are output from the host system 1 from the time of turn-on of the host system 1 to the time of turn-off of the host system 1. Then, a readout address which is output many times can be set as an address indicated by an initial value when the host system 1 is next turned on.

In the example of the process in which the address comparator 33 stores a histogram of the number of outputs, next, the address comparator 33 stores a histogram of the number of outputs of readout addresses designated by readout commands which are output from the host system 1 during a period in which the host system 1 provides a predetermined number of outputs. Then, a readout address which is output many times and satisfies predetermined requirements is set as a comparison address, and data at the comparison address is stored in the buffer 37.

After the data at the comparison address is stored in the buffer 37, the address comparator 33 erases the histogram of the number of outputs which has already been stored therein. If one of readout addresses designated by readout commands which are expected to be output during a period in which the host system 1 next provides the predetermined number of new outputs matches the comparison address which has already been set, the host system 1 reads out data at the one readout address from the buffer 37.

The address comparator 33 stores a new histogram of the number of outputs of the readout addresses designated by readout commands which are output during the period in which the host system 1 next provides the predetermined number of the new outputs. A readout address which is output many times and satisfies the predetermined requirements is set as a new comparison address, and data at the new comparison address is stored in the buffer 37. At that time, in a case where the data at the new comparison address has already been stored in the buffer 37, it is unnecessary to newly store the data at the new comparison address in the buffer 37. Thereafter, the same process flow as discussed above will proceed.

<Fourth Preferred Embodiment>

FIG. 6 is a view showing time series of variations of an address indicated by an initial value or a current value and an object of access for readout according to the fourth preferred embodiment. The address indicated by an initial value or a current value includes three addresses indicated by a specific initial value, and is not updated by the address comparator 33 even while the host system 1 is consecutively outputting readout commands. The host system 1 reads out data on a page-by-page basis. Also, the buffer 37 is able to store three pages of data, to correspond to the address comparator 33 which stores three addresses.

Specific examples of the above-noted addresses indicated by the specific initial value are as follows. Cited firstly is a readout address designated by a readout command which is estimated to be probably output repeatedly from the host system 1. In a case where such address is used, the address comparator 33 stores the address without updating it, and the buffer 37, on the other hand, stores data at the address without updating it. The above firstly-cited address can be conveniently employed at the time of designing data which is expected to be stored in the memory 4 in a situation in which the host system 1 is estimated to probably read out specific data repeatedly.

Cited secondly as a specific example of the above-noted address indicated by the specific initial value is an address of data which is estimated to probably cause an error when processed by the host system 1. For an error which occurs while the host system 1 is processing data, there is a case where an error may occur in the data itself while the data is being read out from the memory 4 and a case where an error may occur in other data while the data is being read out from the memory 4, for example. In the case where an error occurs in other data while the data is being read out from the memory 4, the likelihood of unintentional rewriting of data stored in a memory cell which is not an object of access for readout is taken into account.

Even when an error occurs while the host system 1 is processing data, the address comparator 33 stores the above-cited address without updating it, and the buffer 37 stores the data at the above-cited address without updating it. The above-cited address can be conveniently employed in a situation in which data which is estimated to probably cause an error is identified in view of a structure of a memory cell array of the memory 4.

<Fifth Preferred Embodiment>

According to the first, second, third, and fourth preferred embodiments, a "read disturb" phenomenon can be avoided or suppressed in data which is repeatedly read out by the host system 1. The present invention can be applied to a case where an error actually occurs in data which is repeatedly read out by the host system 1.

Each time an error occurs while the host system 1 is processing data, the address comparator 33 stores an address of data in which an error occurs. Also, the buffer 37 stores error-corrected data. When the host system 1 is next turned on, the address comparator 33 keeps storing the address of the data in which the error occurs, which address has been stored therein at the time of previous turn-off of the host system 1.

The host system 1 can repeatedly read out data in which an error has actually occurred and has been corrected by gaining access to the buffer 37 without a need for access to the memory 4, so that a "read disturb" phenomenon can be further avoided or suppressed.

While the invention has been shown and described in detail, the foregoing description is in all aspects illustrative and not restrictive. It is therefore understood that numerous modifications and variations can be devised without departing from the scope of the invention.

What is claimed is:

1. A memory controller for controlling access to a storage device, comprising:
    an address comparator for comparing a readout address which is output from a host system which processes data stored in the storage device, with one or more second addresses used for readout which are output from the host system previous to the first address;
    a predetermined address which is previously set and included in the second addresses and treated as having been output before the host system outputs the readout address when the host is turned on;
    a buffer including a non-volatile memory for storing data at the predetermined address; and
    a part for outputting data at the readout address which is read out from the buffer to the host system if the readout address is included in the predetermined address, and outputting data at the readout address which is read out from the storage device to the host system if the readout address is not included in the predetermined address, wherein the predetermined address includes a last used address prior to the host being turned off.

2. The memory controller according to claim 1, further comprising:
a data selector for establishing access between the buffer and the host system when data is output from the buffer, and establishing access between the storage device and the host system when data read out from the storage device is output.

3. The memory controller according to claim 1, further comprising:
a part for fixing an operation mode of the buffer to an accessible mode when data is output from the buffer, the host notified of the operation mode; and
a part for notifying an operation mode of the storage device to the host system when data read out from the storage device is output.

4. The memory controller of claim 1, wherein the predetermined address includes a specific fixed address.

5. A memory controller for controlling access to a storage device, comprising:
an address comparator for comparing a readout address which is output from a host system which processes data stored in the storage device, with a plurality of predetermined addresses which are previously set;
a buffer for storing data at the predetermined addresses; and
a part for outputting data at the readout address which is read out from the buffer to the host system if the readout address is included in the predetermined addresses, and outputting data at the readout address which is read out from the storage device to the host system if the readout address is not included in the predetermined addresses, wherein
the predetermined addresses include a specified readout address which is estimated, prior to when the host system is turned on, to be probably output repeatedly by the host system, and wherein
the predetermined addresses include a last used address prior to the host being turned off.

6. The memory controller of claim 5, wherein the address comparator stores a histogram of a number of outputs of readout addresses which are output from the host system.

7. The memory controller according to claim 5, wherein the predetermined addresses include a fixed address which is treated as having been output before the host system outputs the first address when the host system is turned on.

8. The memory controller according to claim 5, further comprising:
a data selector for establishing access between the buffer and the host system when data is output from the buffer, and establishing access between the storage device and the host system when data read out from the storage device is output.

9. The memory controller according to claim 5, further comprising:
a part for fixing an operation mode of the buffer to an accessible mode when data is output from the buffer, the host notified of the operation mode; and
a part for notifying an operation mode of the storage device to the host system when data read out from the storage device is output.

10. A memory controller for controlling access to a storage device, comprising:
an address comparator for comparing a readout address which is output from a host system which processes data stored in the storage device, with a plurality of predetermined addresses which are previously set;
a buffer for storing data at the predetermined addresses; and
a part for outputting data at the readout address which is read out from the buffer to the host system if the readout address is included in the predetermined address, and outputting data at the readout address which is read out from the storage device to the host system if the readout address is not included in the predetermined addresses, wherein
the predetermined addresses include an address of data which is estimated to probably cause an error when processed by the host system, and wherein
the predetermined addresses include a last used address prior to the host being turned off.

11. The memory controller according to Claim 10, wherein the predetermined addresses include a fixed address which is treated as having been output before the host system outputs the first address when the host system is turned on.

12. The memory controller according to claim 10, further comprising:
a data selector for establishing access between the buffer and the host system when data is output from the buffer, and establishing access between the storage device and the host system when data read out from the storage device is output.

13. The memory controller according to claim 10, further comprising:
a part for fixing an operation mode of the buffer to an accessible mode when data is output from the buffer, the host notified of the operation mode; and
a part for notifying an operation mode of the storage device to the host system when data read out from the storage device is output.

14. A memory controller for controlling access to a storage device, comprising:
an address comparator for comparing a first address used for readout which is output from a host system which processes data stored in the storage device, with one or more second addresses used for readout which are output from the host system previous to the first address;
a buffer for storing data at the second addresses; and
a part for outputting data at the first address which is read out from the buffer to the host system if the first address is included in the second addresses, and outputting data at the first address which is read out from the storage device to the host system if the first address is not included in the second addresses, wherein
when an error is not detected in the data at the first address in the storage device, the second addresses are updated to include the first address,
when an error is detected in the data at the first address in the storage device, error corrected data is stored in the buffer and the second address associated with the error corrected data is not overwritten in next operations where an error is not detected, and
the address of the error corrected data is kept as one of the second addresses after the host system is turned off.

* * * * *